Patented May 17, 1932

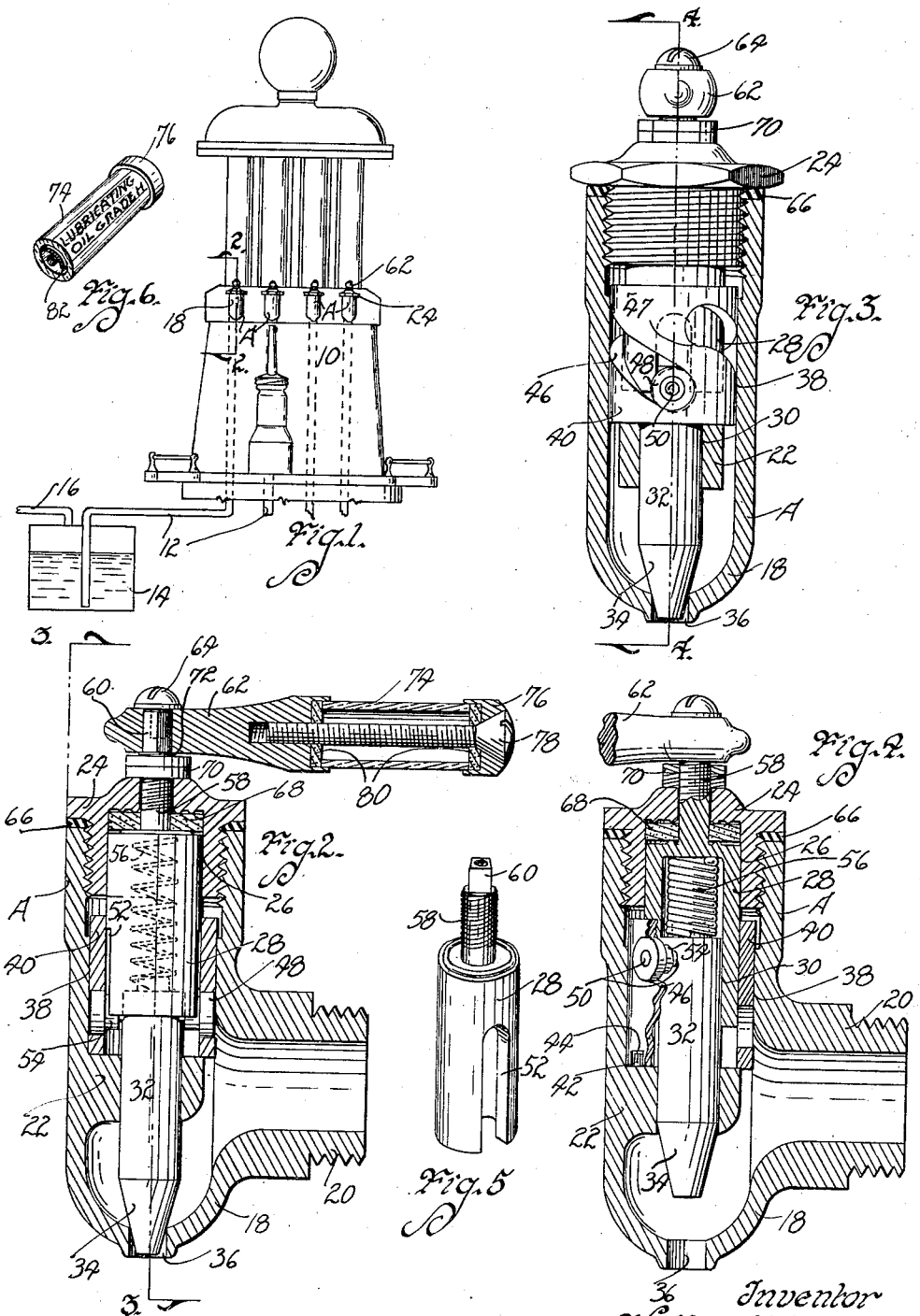

1,858,590

UNITED STATES PATENT OFFICE

WALTER R. HENION, OF MINNEAPOLIS, MINNESOTA, ASSIGNOR TO BOE MANUFACTURING COMPANY, OF MINNEAPOLIS, MINNESOTA, A CORPORATION OF MINNESOTA

OIL FOUNTAIN FAUCET

Application filed February 13, 1930. Serial No. 428,108.

The object of my present invention is to provide a faucet especially designed for oil fountains wherein the oil is supplied to the faucet under pressure, the device being of simple and durable construction, and comparatively inexpensive to manufacture.

More particularly it is my object to provide a faucet construction of improved and more substantial design when compared with the non-drip shut-off faucet illustrated, described and claimed in my co-pending application filed March 24, 1930, Serial Number 438,459.

Another object is to provide in a faucet construction having a valve body, a valve member slidably mounted with respect to the valve body with a groove and pin means for sliding the valve member upon rotation being imparted to it, such rotation being imparted by a sleeve fitting over the valve member and guiding it in conjunction with a lug extending from the side of the valve body, the sleeve having a pair of diametrically opposite vertical grooves coacting with the pin means for rotating the valve member upon rotation of the sleeve.

Another object is to provide the grooved means in a cage which is seated into the valve body and has a notch coacting with a lug therein to prevent rotation of the cage.

Another object is to dispense with ordinary packing means by using a sealing washer interposed between the rotatable sleeve and the valve body with a nut means for adjusting the sealing washer to compensate for wear.

Another object is to provide in a faucet construction a handle having a transparent casing adapted to contain oil of the kind dispensed through the faucet and thereby serve as an indicator to the operator of just what liquid would be discharged from the faucet when it is opened.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a front elevation of an oil fountain showing a plurality of four of my improved faucets applied thereto, part of the figure being diagrammatic.

Figure 2 is an enlarged sectional view on the line 2—2 of Figure 1 illustrating the internal mechanism of one of the faucets.

Figure 3 is a sectional view on the line 3—3 of Figure 2.

Figure 4 is a sectional view on the line 4—4 of Figure 3 showing the valve in opened position rather than in closed position shown in Figures 2 and 3.

Figure 5 is a perspective view of a sleeve part of the valve; and

Figure 6 is a modified view of the valve handle.

On the accompanying drawings, I have used the reference numeral 10 to indicate generally an oil fountain of the type used in oil service stations. Only the upper part of the fountain is illustrated in Figure 1. In connection with the oil fountain 10 I have shown a plurality of four of my oil fountain faucets which are indicated generally by the reference character A. Each of the faucets A is connected with the upper end of an individual supply pipe 12. In connection with one of the supply pipes 12 I have indicated diagrammatically an oil storage tank 14 from which oil is forced under pressure through the pipe 12 and out of the faucet A. Such pressure may be applied to the oil within the tank 14 by introducing air pressure through the pipe 16.

My oil fountain faucet A consists of a body member 18 screw threaded as at 20 for insertion into a pipe fitting or the like. Within the body portion 18 a perforated lug 22 is formed. The body portion 18 is open at its upper end and screw threaded to receive a cap 24. The cap 24 is provided with an internal bore 26 in which a sleeve 28 is rotatably mounted. The sleeve 28 is provided with an internal bore 30 adapted to slidably receive a valve member 32. The valve member 32 is slidable through the perforation in the lug 22 and is tapered at its lower end as indicated at 34. The tapered portion of the valve member 32 is adapted to fit in a discharge opening 36.

Within a bore 38 formed in the valve body 18 a cam cage 40 is mounted. The lower end of the cam cage 40 is supported on the lug 22. The cam cage 40 is held against rotating movement by means of a pin 42 (see Figure 4) extending up from the lug 22 and located in a notch 44 formed in the cage 40.

The cage 40 is provided with oppositely arranged spiral grooves 46 in which rollers 48 are adapted to travel. The rollers 48 are mounted on pins 50 extending from the valve member 32. Longitudinally arranged slots 52 are formed in opposite sides of the sleeve 28 through which the pins 50 extend. Rollers 54 are mounted on the pins 50 for travel with respect to the slots 52.

The valve member 32 is normally maintained in a closed position by means of a spring 56 contacting with the inner end of the sleeve 28 as shown in Figure 4, and with the upper end of the valve member 32. The spring 56 urges the valve member 32 to seating position and when allowed to act causes the valve member 32 to rotate by causing downward spiral movement of the pins 50 through the spiral grooves 46 of the cage 40.

A stem 58 is secured to the upper end of the sleeve 28 and extends through an opening in the cap 24. The upper end of the stem 58 is square as indicated at 60 to fit within a square opening in a handle 62 whereby swinging movement of the handle will impart rotation to the sleeve 28. A screw 64 extends into the portion 60 of the stem 58 for holding the handle in position on the stem 58.

From the foregoing description it will be obvious that rotation of the sleeve 28 will cause longitudinal movement of the valve member 32 relative thereto and rotation of the valve member coincident therewith so that the rollers 48 traveling in the grooves 46 will cause opening or closing movement of the valve, depending on which way the handle 62 is turned. The upper ends of the spiral grooves 46 are provided with slight depressions 47 for maintaining the faucet in open position.

To prevent the leakage of fluid under pressure from the faucet a gasket 66 is provided and a sealing washer 68 is interposed between the upper end of the sleeve 28 and the inner upper end of the cap 24. The sealing washer 68 may be of fibre, lead or resilient material and is preferably maintained in tight condition by means of an adjusting nut 70 and a lock nut 72. The nuts 70 and 72 are not essential, however, as the spring 56 exerts an upward thrust on the sleeve 28 tending to tightly engage the sealing washer 68 between the sleeve and the cap 24. The nuts 70 and 72, however, serve the useful purpose of preventing any downward movement of the sleeve 28 against the action of the spring 56 caused by the operator pressing down on the handle 62.

The handle 62 is of novel construction including a transparent tube 74 adapted to contain oil or other fluid of the character dispensed through the faucet. Thus it is not necessary to have an indicating mark on the handle and when the faucet is used on a different liquid, the handle may be disassembled and filled with a portion of that liquid and thus it can be readily changed to indicate the different liquid that will be dispensed from it. The transparent tube 74 is held in position by a cap 76 which in turn is held in position by a screw 78. Gasket washers 80 are provided to prevent leakage of a liquid from the tube 74. Instead of a liquid, a slip of paper 82 with the name of the liquid can be enclosed in the transparent tube 74 as in Figure 6.

My present invention is especially adapted for dispensing a liquid under pressure and is designed to effectively prevent the leakage of such liquid.

Changes may be made in the construction and arrangement of the parts of my oil fountain faucet, and it may be used on devices other than oil fountains without departing from the real spirit and purpose of my invention. It is, therefore, my intention to cover by my claims such modified forms of structure and use of mechanical improvements as will be reasonably included within their scope.

I claim as my invention:—

1. In a faucet construction, a cylindrical valve body, a valve member slidable relative thereto, a cylindrical cage inserted in said body having a spiral groove, said valve member having a pin coacting therewith, and notch and pin means to prevent rotation of the cage with respect to the valve body.

2. In a faucet construction, a valve body, a sleeve rotatable therein, a lug spaced from said sleeve, a valve member guidingly received in the sleeve and the lug and coacting means between the sleeve and the valve member for rotating the latter from the former.

3. In a faucet construction, a valve body, a valve member slidable relative thereto, spiral groove and pin means for sliding said valve member upon rotation thereof and means for rotating said valve member comprising a handle and a sleeve, said sleeve fitting over the valve member and having longitudinal slots coacting with said pin means, said pin means having rollers to coact with said spiral and longitudinal grooves.

4. In a faucet construction, a valve body, a valve member therein and a handle for manipulating said valve member, said handle having a transparent casing adapted to contain a means to serve as an indicator for the kind of fluid dispensed through the faucet.

5. In a faucet construction, a valve body, a valve member slidable relative thereto, spiral groove and pin means for sliding said valve member upon rotation thereof, means for rotating said valve member comprising a handle and a sleeve, said sleeve fitting over the valve member and having longitudinal slots coacting with said pin means, and a spring interposed between said valve member and the inner end of said sleeve.

WALTER R. HENION.